(12) United States Patent
Frank

(10) Patent No.: US 12,401,551 B2
(45) Date of Patent: *Aug. 26, 2025

(54) DETERMINING A COMPOSITE ZERO-FORCING EQUALIZER

(71) Applicant: Lenovo (Singapore) Pte. Ltd., New Tech Park (SG)

(72) Inventor: Colin D. Frank, Park Ridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 53 days.

This patent is subject to a terminal disclaimer.

(21) Appl. No.: 18/560,356

(22) PCT Filed: May 19, 2022

(86) PCT No.: PCT/IB2022/054709
§ 371 (c)(1),
(2) Date: Nov. 10, 2023

(87) PCT Pub. No.: WO2022/243943
PCT Pub. Date: Nov. 24, 2022

(65) Prior Publication Data
US 2024/0243950 A1 Jul. 18, 2024

Related U.S. Application Data

(60) Provisional application No. 63/191,277, filed on May 20, 2021.

(51) Int. Cl.
*H04L 25/03* (2006.01)
*H04B 7/08* (2006.01)
*H04L 25/02* (2006.01)

(52) U.S. Cl.
CPC ..... *H04L 25/03133* (2013.01); *H04B 7/0854* (2013.01); *H04L 25/022* (2013.01)

(58) Field of Classification Search
CPC ............ H04L 25/03133; H04L 25/022; H04B 7/0854
See application file for complete search history.

(56) References Cited

U.S. PATENT DOCUMENTS

| 5,144,308 | A  | * | 9/1992  | Norsworthy | ......... | H04B 14/046 |
|-----------|----|---|---------|------------|-----------|-------------|
|           |    |   |         |            |           | 341/131     |
| 8,855,183 | B2 | * | 10/2014 | Dua        | ......... | H04B 7/0885 |
|           |    |   |         |            |           | 375/232     |

(Continued)

FOREIGN PATENT DOCUMENTS

| SG | 144779 A1 | * | 8/2008 | | |
|----|-----------|---|--------|---|---|
| WO | WO-0147167 A1 | * | 6/2001 | ......... | H04L 25/0204 |
| WO | WO-2013185820 A1 | * | 12/2013 | ........... | G01R 31/025 |

OTHER PUBLICATIONS

PCT/IB2022/054709, "Notification of Transmittal of the International Search Report and the Written Opinion of the International Searching Authority, or the Declaration", International Searching Authority, Aug. 12, 2022, pp. 1-11.

(Continued)

*Primary Examiner* — Jean B Corrielus
(74) *Attorney, Agent, or Firm* — Kunzler Bean & Adamson

(57) ABSTRACT

Apparatuses, methods, and systems are disclosed for determining a composite zero-forcing equalizer. One method includes measuring a first frequency response at a first antenna connector. The method includes determining a first zero-forcing equalizer for the first antenna connector as an inverse of the first frequency response. The method includes measuring a second frequency response at a second antenna connector. The method includes determining a second zero-forcing equalizer for the second antenna connector as an inverse of the second frequency response. The method includes determining a composite zero-forcing equalizer as (Continued)

a normalized power weighted linear combination of absolute value magnitudes of the first zero-forcing equalizer and the second zero-forcing equalizer.

20 Claims, 6 Drawing Sheets

(56) References Cited

U.S. PATENT DOCUMENTS

| | | | | |
|---|---|---|---|---|
| 9,461,851 | B1* | 10/2016 | Liao | H04L 25/03885 |
| 2007/0049199 | A1* | 3/2007 | Lim | H04L 27/2647 |
| | | | | 455/501 |
| 2007/0147336 | A1* | 6/2007 | Lee | H04L 7/10 |
| | | | | 370/350 |
| 2010/0075706 | A1* | 3/2010 | Montojo | H04W 72/1273 |
| | | | | 455/517 |
| 2019/0319657 | A1* | 10/2019 | Roy | H04L 25/03993 |
| 2019/0325002 | A1* | 10/2019 | Zeng | G06F 17/11 |
| 2019/0372821 | A1* | 12/2019 | Wu | H04B 7/12 |
| 2021/0302561 | A1* | 9/2021 | Bayesteh | G01S 13/42 |

OTHER PUBLICATIONS

Mohammed et al., "Interference Mitigation in Uplink STBC MC-CDMA System Based on PIC Receiver", Radioelectronics and Communications Systems, vol. 60, No. 11, 2017, pp. 1-10.

Vivo, "Email discussion summary for [98e][112] Transmit diversity and power class related to UL MIMO", 3GPP TSG-RAN WG4 Meeting # 98-e R4-2102960, Jan. 25-Feb. 5, 2021, pp. 1-29.

Qualcomm Inc., "SRS ant switching and EVM equalizer flatness with Tx div", 3GPP TSG-RAN WG4 Meeting #99-e R4-2108793, May 2021, pp. 1-4.

3GPP, "3rd Generation Partnership Project; Technical Specification Group Radio Access Network; NR; User Equipment (UE) radio transmission and reception; Part 1: Range 1 Standalone (Release 17)", 3GPP TS 38.101-1 V17.1.0, Mar. 2021, pp. 1-513.

* cited by examiner

DETERMINING A COMPOSITE ZERO-FORCING EQUALIZER

CROSS-REFERENCE TO RELATED APPLICATIONS

This application is a 371 of international prior Application Number PCT/IB2022/054709, filed May 19, 2022 which claims priority to U.S. provisional Application Ser. No. 63/191,277 entitled "APPARATUSES, METHODS, AND SYSTEMS FOR SPECIFYING SPECTRAL FLATNESS FOR TRANSMIT DIVERSITY AND AN ANTENNA PORT" and filed on May 20, 2021 for Colin D. Frank, which is incorporated herein by reference in its entirety.

FIELD

The subject matter disclosed herein relates generally to wireless communications and more particularly relates to determining a composite zero-forcing equalizer.

BACKGROUND

In certain wireless communications networks, there may be a spectrum flatness requirement. In such networks, multiple antenna connectors may be used.

BRIEF SUMMARY

Methods for determining a composite zero-forcing equalizer are disclosed. Apparatuses and systems also perform the functions of the methods. One embodiment of a method includes measuring, at a device, a first frequency response at a first antenna connector. In some embodiments, the method includes determining a first zero-forcing equalizer for the first antenna connector as an inverse of the first frequency response. In certain embodiments, the method includes measuring a second frequency response at a second antenna connector. In various embodiments, the method includes determining a second zero-forcing equalizer for the second antenna connector as an inverse of the second frequency response. In some embodiments, the method includes determining a composite zero-forcing equalizer as a normalized power weighted linear combination of absolute value magnitudes of the first zero-forcing equalizer and the second zero-forcing equalizer.

One apparatus for determining a composite zero-forcing equalizer includes a processor to: measure a first frequency response at a first antenna connector; determine a first zero-forcing equalizer for the first antenna connector as an inverse of the first frequency response; measure a second frequency response at a second antenna connector; determine a second zero-forcing equalizer for the second antenna connector as an inverse of the second frequency response; and determine a composite zero-forcing equalizer as a normalized power weighted linear combination of absolute value magnitudes of the first zero-forcing equalizer and the second zero-forcing equalizer.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
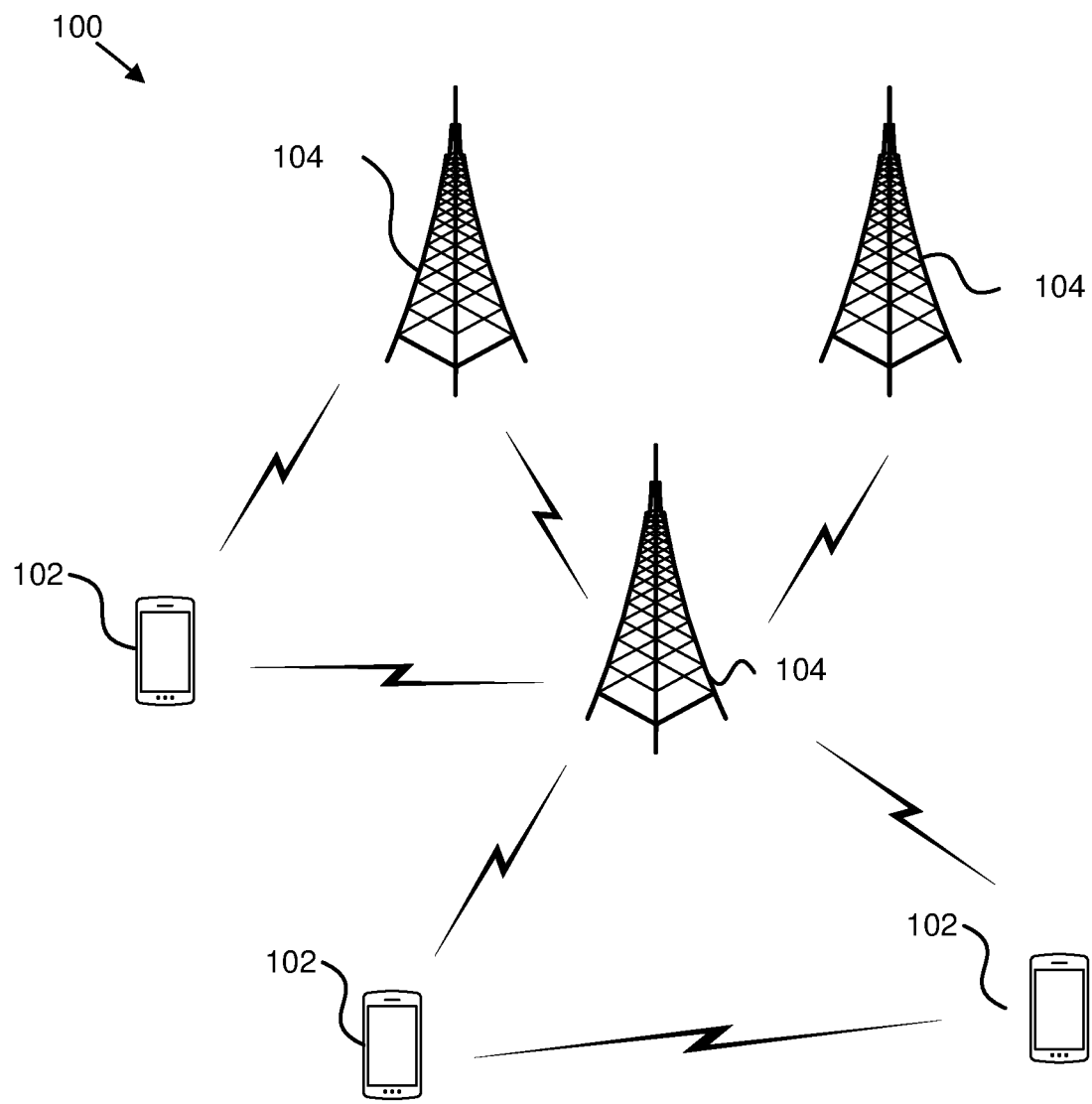
FIG. 1 is a schematic block diagram illustrating one embodiment of a wireless communication system for determining a composite zero-forcing equalizer.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a composite zero-forcing equalizer. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may measure a first frequency response at a first antenna connector. In some embodiments, the remote unit 102 and/or the network unit 104 may determine a first zero-forcing equalizer for the first antenna connector as an inverse of the first frequency response. In certain embodiments, the remote unit 102 and/or the network unit 104 may measure a second frequency response at a second antenna connector. In various embodiments, the remote unit 102 and/or the network unit 104 may determine a second zero-forcing equalizer for the second antenna connector as an inverse of the second frequency response. In some embodiments, the remote unit 102 and/or the network unit 104 may determine a composite zero-forcing equalizer as a normalized power weighted linear combination of absolute value magnitudes of the first zero-forcing equalizer and the second zero-forcing equalizer. Accordingly, the remote unit 102 and/or the network unit 104 may be used for determining a composite zero-forcing equalizer.

Figure 2:
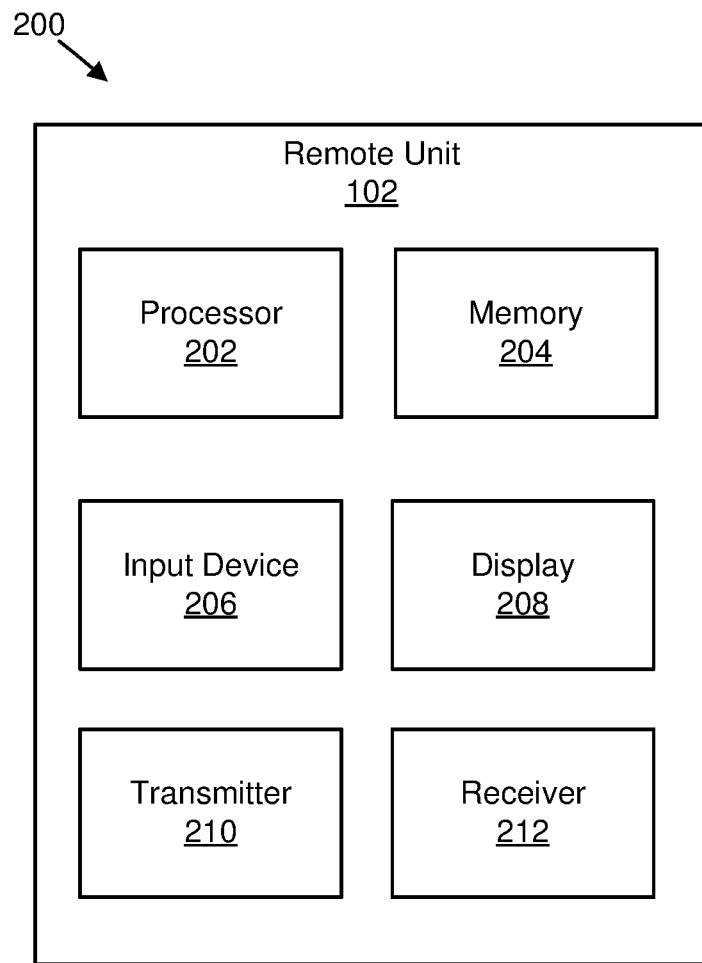
FIG. 2 is a schematic block diagram illustrating one embodiment of an apparatus that may be used for determining a composite zero-forcing equalizer.

FIG. 2 depicts one embodiment of an apparatus 200 that may be used for determining a composite zero-forcing equalizer. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202 may: measure a first frequency response at a first antenna connector; determine a first zero-forcing equalizer for the first antenna connector as an inverse of the first frequency response; measure a second frequency response at a second antenna connector; determine a second zero-forcing equalizer for the second antenna connector as an inverse of the second frequency response; and determine a composite zero-forcing equalizer as a normalized power weighted linear combination of absolute value magnitudes of the first zero-forcing equalizer and the second zero-forcing equalizer.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
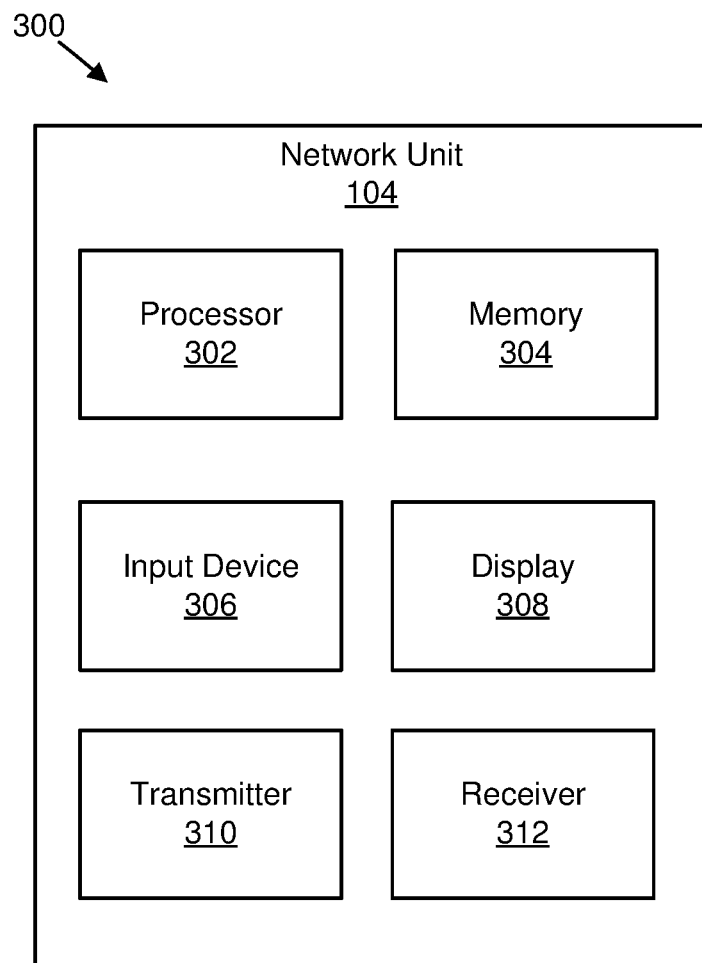
FIG. 3 is a schematic block diagram illustrating one embodiment of an apparatus that may be used for determining a composite zero-forcing equalizer.

FIG. 3 depicts one embodiment of an apparatus 300 that may be used for determining a composite zero-forcing equalizer. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302 may: measure a first frequency response at a first antenna connector; determine a first zero-forcing equalizer for the first antenna connector as an inverse of the first frequency response; measure a second frequency response at a second antenna connector; determine a second zero-forcing equalizer for the second antenna connector as an inverse of the second frequency response; and determine a composite zero-forcing equalizer as a normalized power weighted linear combination of absolute value magnitudes of the first zero-forcing equalizer and the second zero-forcing equalizer.

It should be noted that one or more embodiments described herein may be combined into a single embodiment.

In certain embodiments, transmit ("TX") diversity relies on combining power from two transmitters driving two antenna connectors. In some embodiments, a user equipment ("UE") meets improved performance assumed by dual receiver. In various embodiments, a UE supports 2-layer multiple-input multiple-output ("MIMO") on uplink ("UL") and downlink ("DL"). In such embodiments, the UE has two TX and two receive ("RX") connectors. The UE may also have two power amplifiers ("PAs"). Each transmit connector may also be a receive connector or the transmit and receive connector may be separate.

In certain embodiments, error vector magnitude ("EVM") is used as an equalizer to facilitate meeting a spectrum flatness requirement. If measurements are done per each connector of two connectors, a UE may equalize both connectors individually to result in two sets of equalizer coefficients. To maintain consistency between EVM metric and EVM equalizer requirements, a composite EVM equalizer coefficients using power weighting may be calculated as follows:

$$EC(f) = \frac{P_1 \cdot EC_1(f) + P_2 \cdot EC_2(f)}{P_1 + P_2}.$$

In this equation, $EC_1(f)$ and $EC2(f)$ are complex quantities for subcarrier f, $EC(f)$ is a composite equalizer, and $P_1$ and $P_2$ are in Watts (W) or milliWatts (mW) (e.g., not in dB).

For UE supporting TX diversity, an EVM equalizer spectrum flatness requirement may be specified in Table 1 and Table 2 and may apply for a composite EVM equalizer requirement $|EC(f)|$.

The equation $$EC(f) = \frac{P_1 \cdot EC_1(f) + P_2 \cdot EC_2(f)}{P_1 + P_2}$$

may, in certain circumstances, not be correct and may be failed by a UE meeting the spectrum flatness requirement for each antenna connector.

In one embodiment, a composite equalizer may be calculated using the equation:

$$EC(f) = \frac{P_1|EC_1(f)| + P_2|EC_2(f)|}{P_1 + P_2},$$

where $EC_1(f)$ and $EC_1(f)$ are complex quantities for subcarrier f, and $P_1$ and $P_2$ are in Watts (W) or milliWatts (mW) (e.g., not in dB).

In another embodiment, a spectrum flatness requirement for transmit diversity is met if a spectrum flatness requirement is met per antenna for the antennas used in a transmit diversity transmission.

Circumstances where the equation $$EC(f) = \frac{P_1 \cdot EC_1(f) + P_2 \cdot EC_2(f)}{P_1 + P_2}$$

may not be correct are as follows. Let $H_1(f)$ denote a frequency response at a first antenna connector and $H_2(f)$ denote a frequency response at a second antenna connector. The zero-forcing equalizers for the first and second antenna connectors may be given by $EC_1(f)=H_1^{-1}(f)$ and $EC_2(f)=H_2^{-1}(f)$, respectively. If the spectrum flatness requirement is met for each antenna connector, then it must be:

$$\left|10 * \log_{10}\left|\frac{H_i^{-1}(f_2)}{H_i^{-1}(f_1)}\right|\right| = \left|10 * \log_{10}\left|\frac{H_{1i}(f_1)}{H_{1i}(f_2)}\right|\right| \leq \alpha$$

for i=1, 2 and all $f_1$ and $f_2$ where $\alpha$ is the maximum allowed peak-to-peak value.

For transmit diversity, the frequency response at the first and second antenna connectors is given by $w_1H_1(f)$ and $w_2H_2(f)$, where $w_1$ and $w_2$ are the complex-valued precoder weights applied at the first and second antennas. For cyclic delay diversity ("CDD"), at least one of $w_1$ and $w_2$ will be frequency dependent. However, for simplicity, it may be assumed that both $w_1$ and $w_2$ are frequency independent. With these precoder coefficients, the equalizers for the first and second antenna connectors are given by $EC_1(f)=(w_1H_1(f))^{-1}$ and $EC_2(f)=(w_2H_2(f))^{-1}$.

Let $w_2=-w_1$, and $f_1$ and $f_2$ have values such that at the first antenna connector:

$$\left|10 * \log_{10}\left|\frac{EC_1(f_1)}{EC_1(f_2)}\right|\right| = \left|10 * \log_{10}\left|\frac{(w_1H_1(f_1))^{-1}}{(w_1H_1(f_2))^{-1}}\right|\right| = \left|10 * \log_{10}\left|\frac{H_1(f_2)}{H_1(f_1)}\right|\right| = \beta$$

where $0<\beta\leq\alpha$ is less than the maximum allowed peak-to-peak value so that connector 1 passes the spectrum flatness requirement for the frequency pair $\{f_1, f_2\}$. Let $H_2(f_1)=H_2(f_2)$ so that for the second antenna connector:

$$\left|10 * \log_{10}\left|\frac{EC_2(f_1)}{EC_2(f_2)}\right|\right| = \left|10 * \log_{10}\left|\frac{(w_2H_2(f_1))^{-1}}{(w_2H_2(f_2))^{-1}}\right|\right| = \left|10 * \log_{10}\left|\frac{H_2(f_2)}{H_2(f_1)}\right|\right| = 0$$

so that connector 2 also passes the spectrum flatness requirement for the frequency pair $\{f_1, f_2\}$.

Now for this same frequency pair $\{f_1, f_2\}$, for the equation $$EC(f) = \frac{P_1 EC_1(f) + P_2 EC_2(f)}{P_1 + P_2}$$

the spectrum flatness criteria can fail even though it is passed for each antenna connector.

Since $\alpha>0$, it must be that $H_1(f_1)\neq H_1(f_2)$. If it is assumed that $H_2(f_1)=H_1(f_1)$, then since $H_2(f_1)=H_2(f_2)$ it also follows that $H_2(f_2)\neq H_1(f_2)$.

Finally, if $w_2=-w_1$ and $P_1=P_2$, then $$EC(f) = \frac{P_1 EC_1(f) + P_2 EC_2(f)}{P_1 + P_2} = \frac{(w_1H_1(f))^{-1} + (w_2H_2(f))^{-1}}{2}.$$

Because $$w_2 = -w_1, EC(f) = \frac{(w_1H_1(f))^{-1} - (w_1H_2(f))^{-1}}{2}.$$

At $f_1$, because $$H_2(f_1) = H_1(f_1), \text{ then } EC(f_1) = \frac{(w_1H_1(f_1))^{-1} - (w_1H_1(f_1))^{-1}}{2} = 0.$$

In contrast, at $$f_2, EC(f_2) = \frac{(w_1H_1(f_2))^{-1} - (w_1H_2(f_2))^{-1}}{2} \neq 0$$

because $H_2(f_2)\neq H_1(f_2)$.

As a result, the peak-to-peak variation given by $$\left|10 * \log_{10}\left|\frac{EC(f_1)}{EC(f_2)}\right|\right| = \infty,$$

and the proposed spectrum flatness requirement fails for the frequency pair $\{f_1, f_2\}$ even though it passed for the antenna connectors separately.

Conversely, using equation $$EC(f) = \frac{P_1|EC_1(f)| + P_2|EC_2(f)|}{P_1 + P_2}$$

the transmit diversity spectrum flatness requirement is met whenever the spectrum flatness requirement is met at each of the antenna connectors.

In certain embodiments, a zero-forcing equalizer correction applied in EVM measurement process may meet a spectrum flatness requirement for the EVM measurement to be valid. The EVM equalizer spectrum flatness may be defined in terms of the maximum peak-to-peak ripple of the equalizer coefficients (e.g., dB) across an allocated uplink block. The basic measurement interval may be the same as for EVM.

In some embodiments, a peak-to-peak variation of EVM equalizer coefficients contained within a frequency range of an uplink allocation may not exceed the maximum ripple specified in Table 1 for normal conditions. For uplink allocations contained within both Range 1 and Range 2, the equalizer coefficients evaluated within each of these frequency ranges may meet the corresponding ripple requirement and the following additional requirement: the relative difference between the maximum equalizer coefficient in Range 1 and the minimum equalizer coefficient in Range 2 must not be larger than 5 dB, and the relative difference between the maximum equalizer coefficient in Range 2 and the minimum equalizer coefficient in Range 1 must not be larger than 7 dB.

In various embodiments, an EVM equalizer spectrum flatness may not exceed the values specified in Table 2 for extreme conditions. For uplink allocations contained within both Range 1 and Range 2, the equalizer coefficients evaluated within each of these frequency ranges may meet the corresponding ripple requirement and the following additional requirement: the relative difference between the maximum equalizer coefficient in Range 1 and the minimum equalizer coefficient in Range 2 must not be larger than 6 dB, and the relative difference between the maximum equalizer coefficient in Range 2 and the minimum equalizer coefficient in Range 1 must not be larger than 10 dB.

TABLE 1

Requirements for EVM equalizer spectrum flatness (normal conditions)

| Frequency range | Maximum ripple (dB) |
| --- | --- |
| $F_{UL\_Meas} - F_{UL\_Low} \geq 3$ MHz and $F_{UL\_High} - F_{UL\_Meas} \geq 3$ MHz (Range 1) | 4 (p-p) |
| $F_{UL\_Meas} - F_{UL\_Low} < 3$ MHz or $F_{UL\_High} - F_{UL\_Meas} < 3$ MHz (Range 2) | 8 (p-p) |

NOTE 1:
$F_{UL\_Meas}$ refers to the sub-carrier frequency for which the equalizer coefficient is evaluated
NOTE 2:
$F_{UL\_Low}$ and $F_{UL\_High}$ refer to each NR frequency band specified in Table 5.2-1

TABLE 2

Minimum requirements for EVM equalizer spectrum flatness (extreme conditions)

| Frequency range | Maximum Ripple (dB) |
| --- | --- |
| $F_{UL\_Meas} - F_{UL\_Low} \geq 5$ MHz and $F_{UL\_High} - F_{UL\_Meas} \geq 5$ MHz (Range 1) | 4 (p-p) |
| $F_{UL\_Meas} - F_{UL\_Low} < 5$ MHz or $F_{UL\_High} - F_{UL\_Meas} < 5$ MHz (Range 2) | 12 (p-p) |

NOTE 1:
$F_{UL\_Meas}$ refers to the sub-carrier frequency for which the equalizer coefficient is evaluated
NOTE 2:
$F_{UL\_Low}$ and $F_{UL\_High}$ refer to each NR frequency band specified in Table 5.2-1

Figure 4:
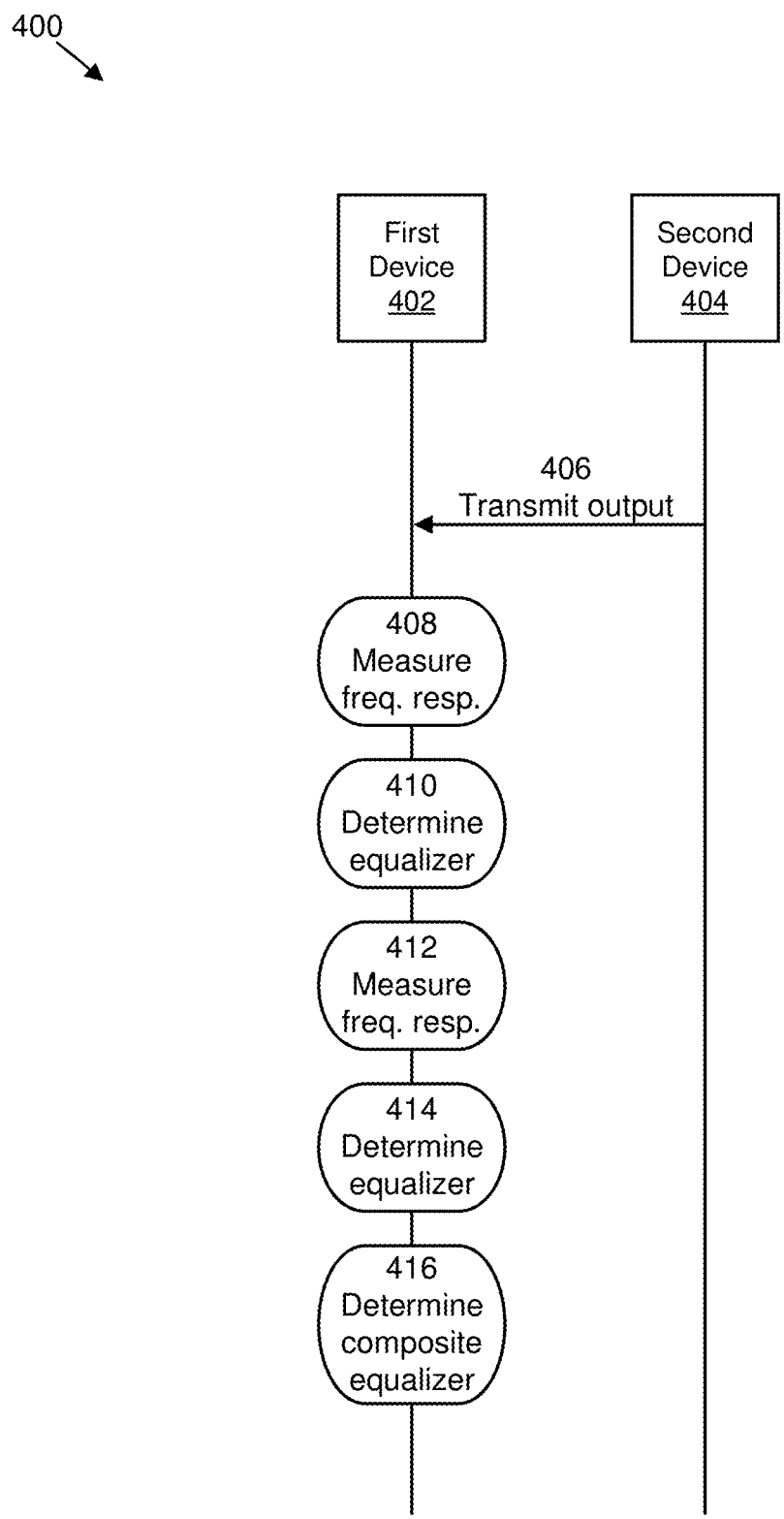
FIG. 4 is a schematic block diagram illustrating one embodiment of a system for determining a composite zero-forcing equalizer.

FIG. 4 is a schematic block diagram illustrating one embodiment of a system 400 for determining a composite zero-forcing equalizer. The system 400 includes a first device 402 (e.g., receiving device) and a second device 404 (e.g., transmitting device). Each of the communications in the system 400 may include on or more messages. In a first communication 406, the second device 404 transmits an output to the first device 402. The first device 402 receives the output at an antenna port. The first device 402 measures 408 a first frequency response at a first antenna connector. Further, the first device 402 determines 410 a first zero-forcing equalizer for the first antenna connector as an inverse of the first frequency response. Moreover, the first device 402 measures 412 a second frequency response at a second antenna connector. The first device 402 determines 414 a second zero-forcing equalizer for the second antenna connector as an inverse of the second frequency response. Further, the first device 402 determines 416 a composite zero-forcing equalizer as a normalized power weighted linear combination of absolute value magnitudes of the first zero-forcing equalizer and the second zero-forcing equalizer.

Figure 5:
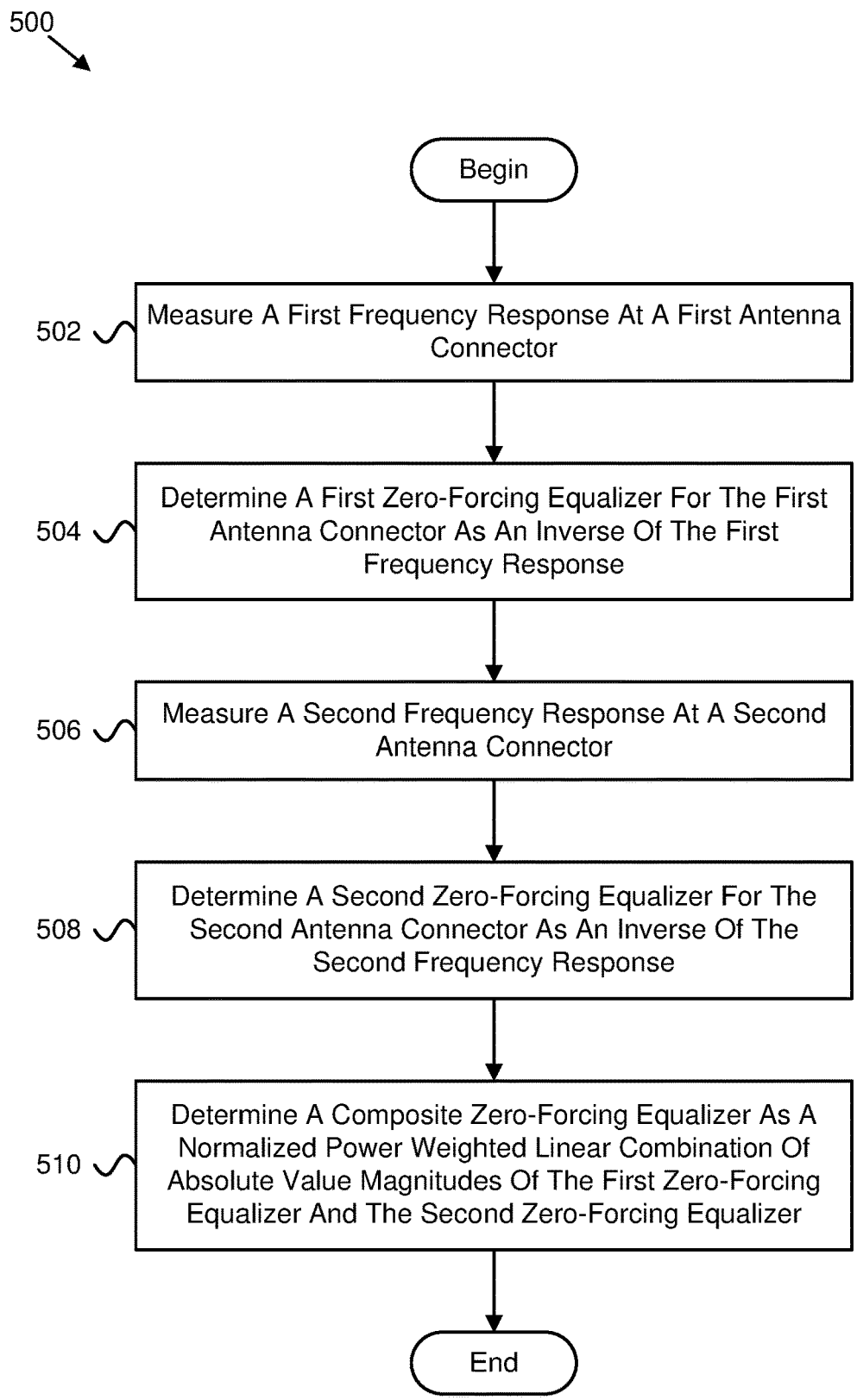
FIG. 5 is a flow chart diagram illustrating one embodiment of a method for determining a composite zero-forcing equalizer.

FIG. 5 is a flow chart diagram illustrating one embodiment of a method 500 for determining a composite zero-forcing equalizer. In some embodiments, the method 500 is performed by an apparatus, such as the remote unit 102 and/or the network unit 104. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes measuring 502 a first frequency response at a first antenna connector. In some embodiments, the method 500 includes determining 504 a first zero-forcing equalizer for the first antenna connector as an inverse of the first frequency response. In certain embodiments, the method 500 includes measuring 506 a second frequency response at a second antenna connector. In various embodiments, the method 500 includes determining 508 a second zero-forcing equalizer for the second antenna connector as an inverse of the second frequency response. In some embodiments, the method 500 includes determining 510 a composite zero-forcing equalizer as a normalized power weighted linear combination of absolute value magnitudes of the first zero-forcing equalizer and the second zero-forcing equalizer.

In certain embodiments, the composite zero-forcing equalizer is determined by $$EC(f) = \frac{P_1|EC_1(f)| + P_2|EC_2(f)|}{P_1 + P_2},$$

and wherein P1 is a first power measured at the first antenna connector, P2 is a second power measured at the second antenna connector, $EC_1(f)$ is the frequency response of the first zero-forcing equalizer for the first antenna connector, and $EC_2(f)$ is the frequency response of the second zero-forcing equalizer for the second antenna connector. In some embodiments, an antenna port comprises the first antenna connector and the second antenna connector. In various embodiments, the method further comprises receiving an output of the antenna port.

In one embodiment, the output of the antenna port comprises a linear combination of transmissions from at least two transmit antennas. In certain embodiments, the antenna port is used for transmit diversity. In some embodiments, the device comprises a user equipment.

In various embodiments, the device comprises a network device. In one embodiment, the device comprises a test and measurement device.

Figure 6:
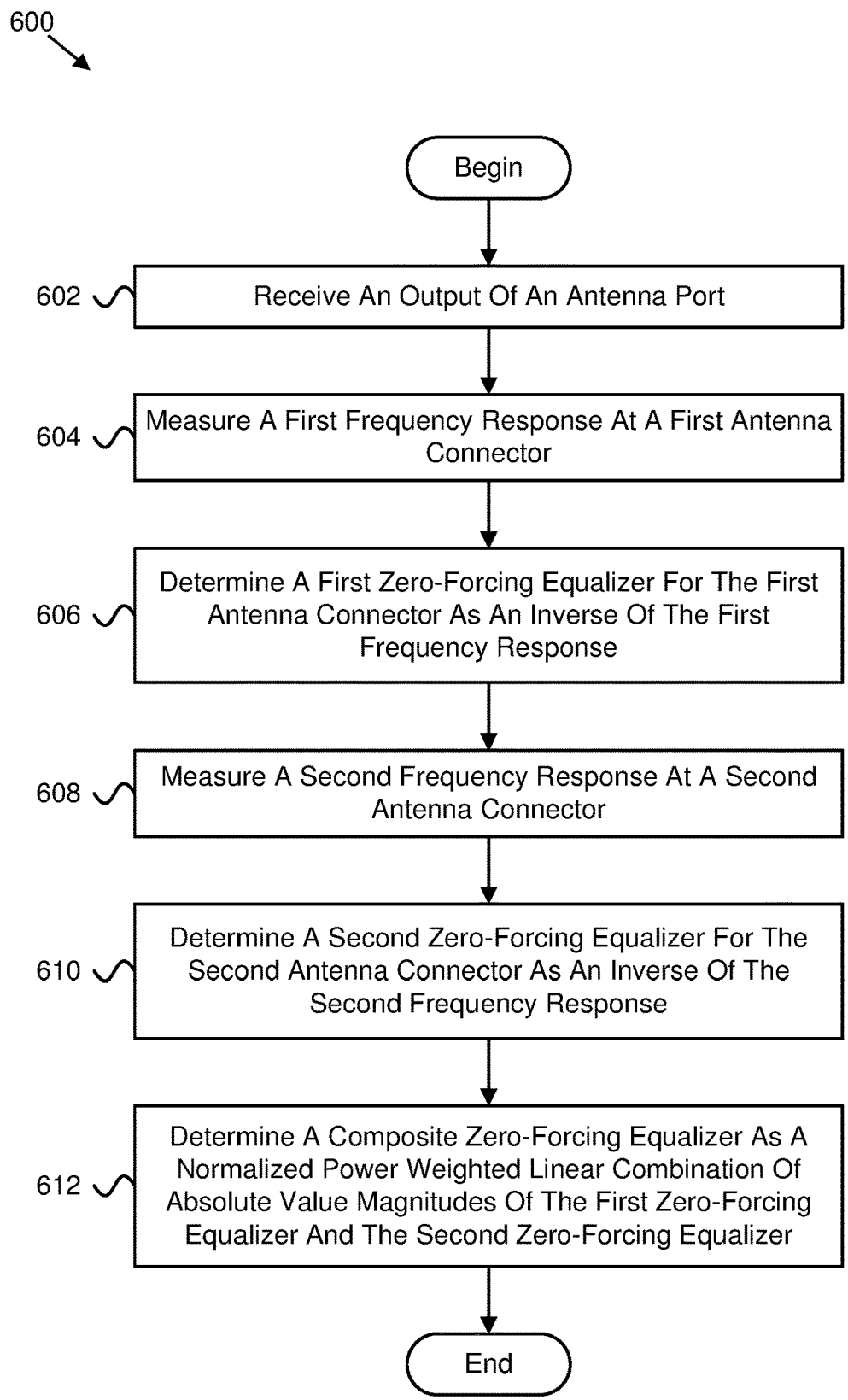
FIG. 6 is a flow chart diagram illustrating another embodiment of a method for determining a composite zero-forcing equalizer.

FIG. 6 is a flow chart diagram illustrating another embodiment of a method 600 for determining a composite zero-forcing equalizer. In some embodiments, the method 600 is performed by an apparatus, such as the remote unit 102 and/or the network unit 104. In certain embodiments, the method 600 may be performed by a processor executing program code, for example, a microcontroller, a microprocessor, a CPU, a GPU, an auxiliary processing unit, a FPGA, or the like.

In some embodiments, the method 600 includes receiving 602 an output of an antenna port. In various embodiments, the method 600 includes measuring 604 a first frequency response at a first antenna connector. In some embodiments, the method 600 includes determining 606 a first zero-forcing equalizer for the first antenna connector as an inverse of the first frequency response. In certain embodiments, the method 600 includes measuring 608 a second frequency response at a second antenna connector. In various embodiments, the method 600 includes determining 610 a second zero-forcing equalizer for the second antenna connector as an inverse of the second frequency response. In some embodiments, the method 600 includes determining 612 a composite zero-forcing equalizer as a normalized power weighted linear combination of absolute value magnitudes of the first zero-forcing equalizer and the second zero-forcing equalizer.

In one embodiment, an apparatus comprises: a processor to: measure a first frequency response at a first antenna connector; determine a first zero-forcing equalizer for the first antenna connector as an inverse of the first frequency response; measure a second frequency response at a second antenna connector; determine a second zero-forcing equalizer for the second antenna connector as an inverse of the second frequency response; and determine a composite zero-forcing equalizer as a normalized power weighted linear combination of absolute value magnitudes of the first zero-forcing equalizer and the second zero-forcing equalizer.

In certain embodiments, the composite zero-forcing equalizer is determined by $$EC(f) = \frac{P_1|EC_1(f)| + P_2|EC_2(f)|}{P_1 + P_2},$$

and wherein P1 is a first power measured at the first antenna connector, P2 is a second power measured at the second antenna connector, $EC_1(f)$ is the frequency response of the first zero-forcing equalizer for the first antenna connector, and $EC_2(f)$ is the frequency response of the second zero-forcing equalizer for the second antenna connector.

In some embodiments, an antenna port comprises the first antenna connector and the second antenna connector.

In various embodiments, the apparatus further comprises a receiver to receive an output of the antenna port.

In one embodiment, the output of the antenna port comprises a linear combination of transmissions from at least two transmit antennas.

In certain embodiments, the antenna port is used for transmit diversity.

In some embodiments, the apparatus comprises a user equipment.

In various embodiments, the apparatus comprises a network device.

In one embodiment, the apparatus comprises a test and measurement device.

In one embodiment, a method at a device comprises: measuring a first frequency response at a first antenna connector; determining a first zero-forcing equalizer for the first antenna connector as an inverse of the first frequency response; measuring a second frequency response at a second antenna connector; determining a second zero-forcing equalizer for the second antenna connector as an inverse of the second frequency response; and determining a composite zero-forcing equalizer as a normalized power weighted linear combination of absolute value magnitudes of the first zero-forcing equalizer and the second zero-forcing equalizer.

In certain embodiments, the composite zero-forcing equalizer is determined by $$EC(f) = \frac{P_1|EC_1(f)| + P_2|EC_2(f)|}{P_1 + P_2},$$

and wherein P1 is a first power measured at the first antenna connector, P2 is a second power measured at the second antenna connector, $EC_1(f)$ is the frequency response of the first zero-forcing equalizer for the first antenna connector, and $EC_2(f)$ is the frequency response of the second zero-forcing equalizer for the second antenna connector.

In some embodiments, an antenna port comprises the first antenna connector and the second antenna connector.

In various embodiments, the method further comprises receiving an output of the antenna port.

In one embodiment, the output of the antenna port comprises a linear combination of transmissions from at least two transmit antennas.

In certain embodiments, the antenna port is used for transmit diversity.

In some embodiments, the device comprises a user equipment.

In various embodiments, the device comprises a network device.

In one embodiment, the device comprises a test and measurement device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
 measure a first frequency response at a first antenna connector;
 determine a first zero-forcing equalizer for the first antenna connector as an inverse of the first frequency response;
 measure a second frequency response at a second antenna connector;
 determine a second zero-forcing equalizer for the second antenna connector as an inverse of the second frequency response; and determine a composite zero-forcing equalizer as a normalized power weighted linear combination of absolute value magnitudes of the first zero-forcing equalizer and the second zero-forcing equalizer.

2. The UE of claim 1, wherein the composite zero-forcing equalizer is determined by $$EC(f) = \frac{P_1|EC_1(f)| + P_2|EC_2(f)|}{P_1 + P_2},$$

and wherein P1 is a first power measured at the first antenna connector, P2 is a second power measured at the second antenna connector, $EC_1(f)$ is the frequency response of the first zero-forcing equalizer for the first antenna connector, and $EC_2(f)$ is the frequency response of the second zero-forcing equalizer for the second antenna connector.

3. The UE of claim 1, wherein an antenna port comprises the first antenna connector and the second antenna connector.

4. The UE of claim 3, wherein the at least one processor is configured to cause the UE to receive an output of the antenna port.

5. The UE of claim 4, wherein the output of the antenna port comprises a linear combination of transmissions from at least two transmit antennas.

6. The UE of claim 3, wherein the antenna port is used for transmit diversity.

7. The UE of claim 1, further comprising a test and measurement device.

8. A method performed by a user equipment (UE), the method comprising:
  measuring a first frequency response at a first antenna connector;
  determining a first zero-forcing equalizer for the first antenna connector as an inverse of the first frequency response;
  measuring a second frequency response at a second antenna connector;
  determining a second zero-forcing equalizer for the second antenna connector as an inverse of the second frequency response; and
  determining a composite zero-forcing equalizer as a normalized power weighted linear combination of absolute value magnitudes of the first zero-forcing equalizer and the second zero-forcing equalizer.

9. The method of claim 8, wherein the composite zero-forcing equalizer is determined by $$EC(f) = \frac{P_1|EC_1(f)| + P_2|EC_2(f)|}{P_1 + P_2},$$

and wherein P1 is a first power measured at the first antenna connector, P2 is a second power measured at the second antenna connector, $EC_1(f)$ is the frequency response of the first zero-forcing equalizer for the first antenna connector, and $EC_2(f)$ is the frequency response of the second zero-forcing equalizer for the second antenna connector.

10. The method of claim 8, wherein an antenna port comprises the first antenna connector and the second antenna connector.

11. The method of claim 10, further comprising receiving an output of the antenna port.

12. The method of claim 11, wherein the output of the antenna port comprises a linear combination of transmissions from at least two transmit antennas.

13. The method of claim 10, wherein the antenna port is used for transmit diversity.

14. A processor for wireless communication, comprising:
  at least one controller coupled with at least one memory and configured to cause the processor to:
    measure a first frequency response at a first antenna connector;
    determine a first zero-forcing equalizer for the first antenna connector as an inverse of the first frequency response;
    measure a second frequency response at a second antenna connector;
    determine a second zero-forcing equalizer for the second antenna connector as an inverse of the second frequency response; and
    determine a composite zero-forcing equalizer as a normalized power weighted linear combination of absolute value magnitudes of the first zero-forcing equalizer and the second zero-forcing equalizer.

15. A base station, comprising:
  at least one memory; and
  at least one processor coupled with the at least one memory and configured to cause the base station to:
    receive an output of an antenna port;
    measure a first frequency response at a first antenna connector;
    determine a first zero-forcing equalizer for the first antenna connector as an inverse of the first frequency response;
    measure a second frequency response at a second antenna connector;
    determine a second zero-forcing equalizer for the second antenna connector as an inverse of the second frequency response; and
    determine a composite zero-forcing equalizer as a normalized power weighted linear combination of absolute value magnitudes of the first zero-forcing equalizer and the second zero-forcing equalizer.

16. The base station of claim 15, wherein the composite zero-forcing equalizer is determined by $$EC(f) = \frac{P_1|EC_1(f)| + P_2|EC_2(f)|}{P_1 + P_2},$$

and wherein P1 is a first power measured at the first antenna connector, P2 is a second power measured at the second antenna connector, $EC_1(f)$ is the frequency response of the first zero-forcing equalizer for the first antenna connector, and $EC_2(f)$ is the frequency response of the second zero-forcing equalizer for the second antenna connector.

17. The base station of claim 15, wherein an antenna port comprises the first antenna connector and the second antenna connector.

18. The base station of claim 17, wherein the at least one processor is configured to cause the base station to receive an output of the antenna port.

19. The base station of claim 18, wherein the output of the antenna port comprises a linear combination of transmissions from at least two transmit antennas.

20. The base station of claim 17, wherein the antenna port is used for transmit diversity.

* * * * *